March 19, 1929.  W. M. GARDNER  1,705,517
VEHICLE ADVERTISING SIGN
Filed March 17, 1927
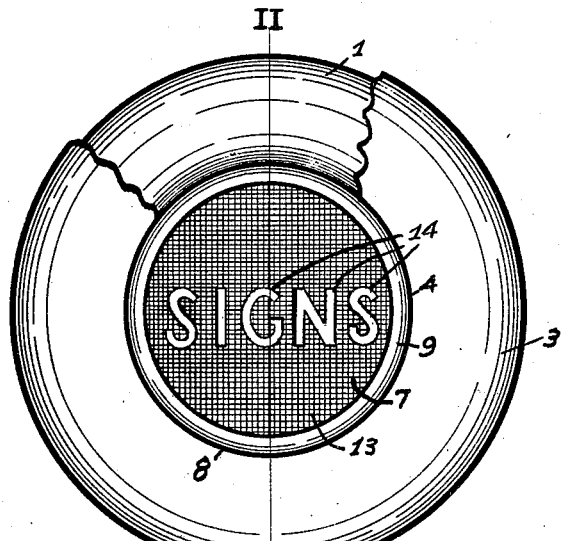
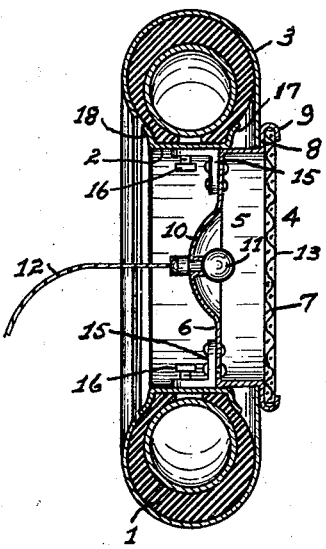
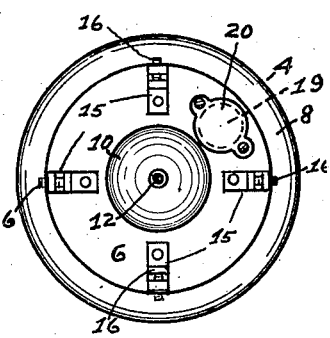

Patented Mar. 19, 1929.

1,705,517

UNITED STATES PATENT OFFICE.

WILLIAM M. GARDNER, OF PITTSBURGH, PENNSYLVANIA.

VEHICLE ADVERTISING SIGN.

Application filed March 17, 1927. Serial No. 176,038.

My invention relates broadly to signs particularly to illuminated signs, and while primarily intended for displaying advertisements and adapted for connection with the spare tire rim of a motor vehicle, it will be obvious that the device may be employed for any other purposes wherein it is found to be applicable.

Important objects of the invention are to provide a device of the character stated, in a manner as hereinafter referred to, which is adapted for adjustable attachment to a motor vehicle spare tire rim, which is clearly legible in the daylight and also at night, and which may be readily fixed in position or removed therefrom.

Further objects of the invention are to provide a device of the type stated, which is simple in its construction and arrangement, strong, durable and efficient in its use, compact, attractive in appearance, and comparatively inexpensive to manufacture.

With the foregoing and other objects in view which will appear as the description proceeds, the invention resides in the combination and arrangement of parts and in the details of construction hereinafter described and claimed, it being understood that changes in the precise embodiment of the invention hereinafter disclosed can be made within the scope of what is claimed without departing from the spirit of the invention.

In the drawing wherein like numerals of reference designate corresponding parts throughout the several views:—

Figure 1 is a rear view of an advertising sign constructed in accordance with the invention and attached to a motor vehicle tire rim.

Figure 2 is a sectional view on line II—II, Figure 1.

Figure 3 is a side view of the device illustrating a modification of its attachment with a motor vehicle tire rim, the latter being in section.

Figure 4 is a forward end view of the device.

Referring in detail to the drawing 1 denotes a pneumatic rubber motor vehicle tire, mounted on a tire rim 2 and enclosed by a tire cover 3. The tire 1, rim 2 and cover 3 are of the usual construction now commonly employed on motor vehicles.

My improved sign is particularly adapted for attachment to the spare tire and rim ordinarily carried at the rear end of a motor vehicle for emergency purposes.

It is well known that tire covers are now in use displaying advertising matter which is legible in the daylight only but not discernible in the dark or at night.

In describing my device the terms "front" and "rear" are applied thereto as relative to the disposition of the associated motor vehicle and with respect to its attachment with the latter.

My sign comprises a hollow casing or body portion 4, including a cylindrical side wall 5, a front wall 6, and a circular rear display plate 7. The side wall 5 and the front wall 6, are preferably integrally formed from sheet metal. The rear end of the side wall 5 is provided with a laterally disposed, outwardly extending flange 8, which overlaps and engages the peripheral edge of the circular display plate 7, as indicated at 9, for maintaining the latter in position.

The center of the front wall 6 is formed with a forwardly disposed reflector portion 10. An electric lamp 11 is mounted in the body portion 4 within the reflector portion 10 and is provided with an electrical conductor 12 which connects with the ignition and lighting system of the motor vehicle. The control of the lamps 11, in the usual manner, will effect constant or intermittent illumination as desired. The arrangement of the reflector portion 10 will project the light from the lamp 11 directly against the inner side of the display plate 7.

The display plate 7 is preferably constructed from composition filled fabricated wire sheet material, which is translucent except when covered with a covering of black paint. This material is preferred to glass for constructing the display plate 7 for the reason that it is very light, and capable of withstanding severe vibration and very hard usage without liability of breaking.

The entire outer face 13, of the display plate 7 is covered with a coat of black paint, with the exception of the areas thereof forming the indicia 14. The arrangement renders the display plate 7 impervious to the penetration of the light from the lamp 11, excepting the areas forming the indicia 14. The latter will be prominently displayed and readily legible in the daylight without illumination, and at night by the illumination provided by the lamp 11.

The diameter of the cylindrical casing side wall 5, is approximately commensurate to the inside diameter of the tire rim to which it is attached, and when connecting the device to the tire rim 2, the casing side wall 5 is extended into the latter.

The casing 4 is provided with a plurality of substantially L-shaped attaching brackets 15, which are fixedly riveted, in spaced relation with respect to each other, to the marginal edge of the front wall 6 on the outer side of the latter. Each of the brackets 15 is provided with a threadably mounted set screw 16 which engages the tire rim 2 for fixedly securing the device to the latter.

In Figure 2, the casing 4 is extended through an opening provided therefor in the tire cover 3, and is adjustably secured in position by the engagement of the set screws 16 with the inner side face of the tire rim 2. However, if the tire carrier attachments permit, the device is preferably attached in the manner illustrated in Figure 3. In this latter arrangement, the casing 4 extends into the tire rim 2 and the casing flange 8 seats against one annular flange 17, of the tire rim 2, while the set screws 16 engage the other of said tire rim flanges 18 and fixedly secure the device against movement in any direction.

The front casing wall 6 is formed with an enlarged opening 19 which is closed by a removable cover 20. The opening is provided to admit the hand for replacing lamps when required.

It will here be noted that any other suitable detachable securing elements may be employed to best meet conditions, instead of the brackets 15 and set screws 16, herein illustrated and described. Further the display plate 7 may be constructed from any other suitable material or in any manner that provides for the display of the indicia 14 without illumination in the daylight and with illumination in the dark.

What I claim is:

The combination with a motor vehicle tire rim including a pair of rim flanges, of a display sign comprising a hollow cylindrical casing including an integrally formed inner wall, a portion of said inner wall being formed to provide a reflector, a lamp mounted in said casing and disposed within said reflector, an opaque display plate provided with transparent indicia connected to the outer end of said casing, a plurality of substantially L-shaped attaching brackets, one leg of each of said brackets being fixed to said inner wall, set screws threadedly mounted in the other arms of said brackets, and engaging one of said rim flanges, the outer end of said casing being formed with a laterally disposed annular flange engaging the other of said rim flanges.

In testimony whereof I affix my signature.

WILLIAM M. GARDNER.